(12) United States Patent
Amata et al.

(10) Patent No.: US 10,427,250 B2
(45) Date of Patent: Oct. 1, 2019

(54) SYSTEMS AND METHODS FOR WELDING WIRES FOR WELDING ZINC-COATED WORKPIECES

(71) Applicant: Hobart Brothers Company, Troy, OH (US)

(72) Inventors: Mario Anthony Amata, Dublin, OH (US); Sindhu Hilary Thomas, Beavercreek, OH (US); Joseph C. Bundy, Piqua, OH (US); Tre' Dorell Heflin-King, Dayton, OH (US); Steven Edward Barhorst, Sidney, OH (US)

(73) Assignee: HOBART BROTHERS LLC, Troy, OH (US)

( * ) Notice: Subject to any disclaimer, the term of this patent is extended or adjusted under 35 U.S.C. 154(b) by 336 days.

(21) Appl. No.: 15/136,227

(22) Filed: Apr. 22, 2016

(65) Prior Publication Data

US 2017/0066086 A1 Mar. 9, 2017

Related U.S. Application Data

(60) Provisional application No. 62/213,837, filed on Sep. 3, 2015.

(51) Int. Cl.
*B23K 35/22* (2006.01)
*B23K 35/38* (2006.01)
(Continued)

(52) U.S. Cl.
CPC .............. *B23K 35/22* (2013.01); *B23K 9/173* (2013.01); *B23K 35/0255* (2013.01);
(Continued)

(58) Field of Classification Search
CPC ............ B23K 35/0255; B23K 35/0261; B23K 35/0266; B23K 35/0294; B23K 35/22;
(Continued)

(56) References Cited

U.S. PATENT DOCUMENTS 3,431,091 A 3/1969 Soulary
3,519,779 A * 7/1970 Dolomont .............. B23K 35/40
205/139

(Continued)

FOREIGN PATENT DOCUMENTS

DE 10334959 A1 * 2/2005 ......... B23K 35/0266
WO 9838004 9/1998

OTHER PUBLICATIONS

Machine Translation Bouaifi (DE 10,334,959) (translated May 18, 2018) (Year: 2005).*

(Continued)

*Primary Examiner* — David Sample
*Assistant Examiner* — Elizabeth Collister
(74) *Attorney, Agent, or Firm* — McAndrews, Held & Malloy, Ltd.

(57) ABSTRACT

This disclosure relates generally to welding and, more specifically, to electrodes for arc welding, such as Gas Metal Arc Welding (GMAW) or Flux Core Arc Welding (FCAW) of zinc-coated workpieces. In an embodiment, a welding consumable for welding a zinc-coated steel workpiece includes a zinc (Zn) content between approximately 0.01 wt % and approximately 4 wt %, based on the weight of the welding consumable. It is presently recognized that intentionally including Zn in welding wires for welding galvanized workpieces unexpectedly and counterintuitively alleviates spatter and porosity problems that are caused by the Zn coating of the galvanized workpieces.

20 Claims, 1 Drawing Sheet

(51) Int. Cl.
*B23K 35/24* (2006.01)
*B23K 9/173* (2006.01)
*B23K 35/30* (2006.01)
*B23K 35/36* (2006.01)
*B23K 35/40* (2006.01)
*B23K 35/02* (2006.01)
*B23K 35/28* (2006.01)
*B23K 101/34* (2006.01)
*B23K 103/04* (2006.01)

(52) U.S. Cl.
CPC ...... *B23K 35/0261* (2013.01); *B23K 35/0266* (2013.01); *B23K 35/0294* (2013.01); *B23K 35/24* (2013.01); *B23K 35/282* (2013.01); *B23K 35/3046* (2013.01); *B23K 35/3053* (2013.01); *B23K 35/3073* (2013.01); *B23K 35/3093* (2013.01); *B23K 35/3601* (2013.01); *B23K 35/3602* (2013.01); *B23K 35/3607* (2013.01); *B23K 35/3608* (2013.01); *B23K 35/3612* (2013.01); *B23K 35/3618* (2013.01); *B23K 35/38* (2013.01); *B23K 35/383* (2013.01); *B23K 35/40* (2013.01); *B23K 35/406* (2013.01); *B23K 2101/34* (2018.08); *B23K 2103/04* (2018.08)

(58) Field of Classification Search
CPC .. B23K 35/24; B23K 35/282; B23K 35/3046; B23K 35/3053; B23K 35/3073; B23K 35/3093; B23K 35/3601; B23K 35/3602; B23K 35/3607; B23K 35/3608; B23K 35/3612; B23K 35/3618; B23K 35/38; B23K 35/383; B23K 35/40; B23K 35/406; B23K 9/173; B23K 35/28; B23K 35/30

See application file for complete search history.

(56) References Cited

U.S. PATENT DOCUMENTS

| | | | |
|---|---|---|---|
| 3,691,340 A | | 9/1972 | Landis |
| 5,003,155 A | * | 3/1991 | Chai ................. B23K 35/3605 219/137 WM |
| 2007/0251927 A1 | | 11/2007 | Miessbacher |
| 2008/0264924 A1 | * | 10/2008 | Duncan .............. B23K 35/0266 219/145.1 |
| 2013/0233839 A1 | | 9/2013 | Barhorst |
| 2013/0270248 A1 | | 10/2013 | Barhorst |
| 2014/0061179 A1 | * | 3/2014 | Barhorst ............ B23K 35/3612 219/145.22 |
| 2015/0099140 A1 | | 4/2015 | Amata |

OTHER PUBLICATIONS

Merroam-webster.com [https://www.merriam-webster.com/dictionary/alloy] {Accessed May 18, 2018}. (Year: 2018).*
Canadian Office Action Appln No. 2,937,560 dated Sep. 6, 2017 (4 pgs).

* cited by examiner

SYSTEMS AND METHODS FOR WELDING WIRES FOR WELDING ZINC-COATED WORKPIECES

CROSS-REFERENCE TO RELATED APPLICATION

This application claims priority to and the benefit of U.S. Provisional Application Ser. No. 62/213,837, entitled "SYSTEMS AND METHODS FOR WELDING WIRES FOR WELDING ZINC-COATED WORKPIECES", filed Sep. 3, 2015, which is hereby incorporated by reference in its entirety for all purposes.

BACKGROUND

This disclosure relates generally to welding and, more specifically, to electrodes for arc welding, such as Gas Metal Arc Welding (GMAW) or Flux Core Arc Welding (FCAW) of zinc-coated workpieces.

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "welding wire" may refer to any welding wire, rod, or other welding consumable, including tubular welding wires (e.g., metal-cored welding wire, flux-cored welding wire, hollow welding wire) or solid welding wires. The term "galvanized" workpiece, as used herein, is intended to refer to any form of zinc-coated workpiece, including but not limited to, hot dip galvanized workpieces, electroplated workpieces, galvannealed workpieces, or even workpieces coated or painted with a zinc-based primer. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value.

Presently disclosed embodiments include welding wires for welding galvanized steel workpieces. As discussed below, the compositions of the disclosed welding wires reduce spatter while maintaining acceptable porosity levels when welding galvanized steels. As discussed below, when welding galvanized steel workpieces using conventional welding wires, both spatter and porosity are common problems that result from the protective layer of zinc (Zn) on the surface of the galvanized workpiece. However, the compositions of the disclosed welding wires include an intentional Zn addition that, counterintuitively, reduces spatter and maintains acceptable porosity when welding galvanized steel workpieces. That is, in accordance with present embodiments, it is presently recognized that adding or increasing the Zn content of a welding wire unexpectedly diminishes welding issues that are actually caused by the Zn content of the workpiece. To be clear, this disclosed effect runs counter to generally accepted practices for the manufacture of steel welding wires, wherein Zn content is believed to exacerbate spatter and porosity issues and, therefore, is actively avoided. In addition to this Zn content, certain embodiments of the disclosed welding wires include other components, such as organic stabilizers, rare earth components, carbon components, and agglomerated stabilizer components, that cooperate to provide superior welding on Zn coated workpieces.

Figure 1:
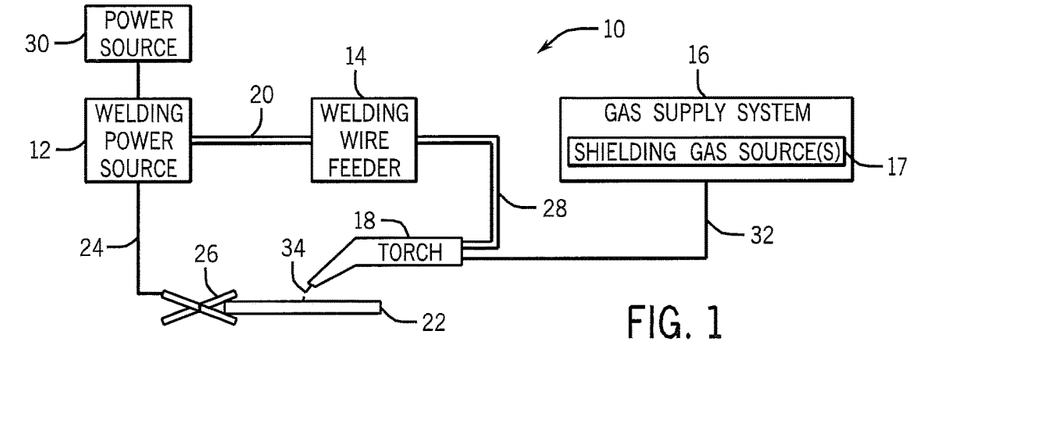
FIG. 1 is a block diagram of a gas metal arc welding (GMAW) system, in accordance with embodiments of the present disclosure.

Turning to the figures, FIG. 1 illustrates an embodiment of a gas metal arc welding (GMAW) system 10 that utilizes welding wire to weld a galvanized workpiece, in accordance with the present disclosure. It should be appreciated that, while the present discussion may focus specifically on the GMAW system 10 illustrated in FIG. 1, the presently disclosed welding electrodes may benefit other arc welding processes (e.g., FCAW, FCAW-G, GTAW, SAW, SMAW, or similar arc welding process) that use a welding wire or rod. The illustrated GMAW welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20, as well as coupled to a workpiece 22 using a lead cable 24 having a clamp 26. In the illustrated embodiment, the welding wire feeder 14 is coupled to the welding torch 18 via a cable bundle 28 in order to supply consumable, welding wire and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the galvanized workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output (e.g., constant voltage (CV), or pulsed), direct current electrode negative (DCEN) output, DC variable polarity, pulsed DC, or a variable balance (e.g., balanced or unbalanced) AC output, as dictated by the demands of the welding system 10. It should be appreciated that the presently disclosed welding wires may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, $Ar/CO_2$ mixtures, $Ar/CO_2/O_2$ mixtures, Ar/He mixtures, and so forth. By specific example, in certain embodiments, the shielding gas flow may include 90% Ar and 10% $CO_2$.

Accordingly, the illustrated welding torch 18 generally receives the welding wire and power from the welding wire feeder 14, and a shielding gas flow from the gas supply system 16 in order to perform GMAW of the workpiece 22. During operation, the welding torch 18 may be brought near the galvanized workpiece 22 so that an arc 34 may be formed between the consumable welding wire (i.e., the welding wire exiting a contact tip of the welding torch 18) and the workpiece 22. Additionally, as discussed below, by controlling the composition of the welding wire, the chemistry of the arc 34 and/or the resulting weld (e.g., composition and physical characteristics) may be varied. For example, the welding wire may include fluxing or alloying components that may affect the welding process (e.g., act as arc stabilizers) and, further, may become at least partially incorporated into the weld, affecting the mechanical properties of the weld. Furthermore, certain components of the welding wire may also provide additional shielding atmosphere near the arc, affect the transfer properties of the arc 34, deoxidize the surface of the workpiece, and so forth.

In general, welding on galvanized steel workpieces generates significantly more spatter and produces greater weld porosity. Spatter is the term generally used to refer to droplets or globules of molten weld metal that are ejected during welding and solidify onto the surface of the workpiece or weld, which undesirably degrades the appearance of the weld and/or workpiece and introduces additional debris into the welding environment. Accordingly, spatter results in additional post-welding clean-up time and cost, which reduces productivity for the welder. For the galvanized workpiece 22, the Zn coating is volatized by the heat of the arc 34. As the Zn vapors rise from the workpiece 22, the arc 34 is destabilized, resulting in substantially greater spatter than is typically observed when welding non-galvanized steel workpieces under comparable conditions. The Zn coating of the galvanized workpiece 22 can also affect other aspects of the weld. For example, the Zn coating can promote silicon island formation in the weld deposit, which increases weld porosity. Further, Zn vapors can also become trapped within the solidifying weld metal, which also contributes to weld porosity and/or cracking, especially at lower travel speeds.

One method of reducing spatter and porosity when welding galvanized workpieces is to maintain a low travel speed (e.g., about 20 in/min maximum), which greatly reduces productivity. Another method is to use expensive (often cost prohibitive) high capital welding processes (e.g., laser welding), which may not be suitable for certain applications. In contrast, the disclosed welding wire designs, at least in part, address the aforementioned issues caused by the Zn coating of the galvanized workpiece by incorporating Zn into the welding wire. This counterintuitive method of "fighting fire with fire" unexpectedly enables the formation of sound, low-porosity welds on galvanized workpieces at relatively high travel speeds (e.g., up to approximately 40 in/min) using a GMAW system 10, while producing significantly less (e.g., 30%-50% less) spatter than other welding wires. It is presently recognized that incorporating Zn into welding wires unexpectedly enables substantially less spatter without increasing porosity or resulting in cracking within the weld deposit.

Figure 2:
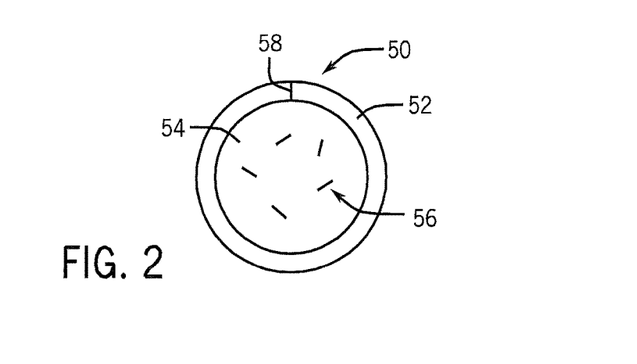
FIG. 2 is a cross-sectional view of a tubular welding wire, in accordance with embodiments of the present disclosure.

A cross-section of an embodiment of the presently disclosed welding wire is illustrated in FIG. 2. FIG. 2 illustrates a tubular welding wire 50 that includes a metallic sheath 52, which encapsulates a granular or powdered core 54 (also referred to as filler), wherein the sheath 52 and/or the core 54 includes Zn. As mentioned above, in other embodiments, the welding wire 50 may be a solid welding wire or welding rod having Zn alloyed into the solid wire or rod, in accordance with the present approach. The metallic sheath 52 of the welding wire 50 illustrated in FIG. 2 may be manufactured from any suitable metal or alloy, such as steel. In certain embodiments, the metallic sheath 52 may account for between approximately 80% and 90% of the total weight of the tubular welding wire 50. For example, in certain embodiments, the metallic sheath 52 may provide approximately 84%, approximately 85%, or approximately 86% of the total weight of the tubular welding wire 50.

The aforementioned Zn content of the disclosed welding wires may be present within any suitable portion of the wire. For example, for the tubular welding wire 50 illustrated in FIG. 2, the Zn content may be present within the sheath 52, within the granular core 54, or any combination thereof. In other embodiments, the Zn content may be plated or coated onto an outer or inner surface of a welding consumable. In still other embodiments, the Zn content may be present as a lubricating coating (e.g., zinc stearate) disposed on the outer surface of a solid or tubular welding consumable.

For example, in certain embodiments, the Zn content of the tubular welding wire 50 may be between approximately 0.01 wt % and approximately 4 wt % (e.g., between approximately 0.02 wt % and approximately 3 wt %, between approximately 0.05 wt % and approximately 2 wt %, between approximately 0.1 wt % and approximately 1.2 wt %, between approximately 0.2 and approximately 0.6 wt %, between approximately 0.3 wt % and approximately 0.6 wt %, between approximately 0.4 and approximately 0.6 wt %, between approximately 0.5 wt % and approximately 0.6 wt %), based on the total weight of the wire 50. In certain embodiments, the core 54 of the tubular welding wire 50 may include between approximately 0.1 wt % and approximately 30 wt % (e.g., between approximately 0.2 wt % and approximately 25 wt %, between approximately 0.5 wt % and approximately 20 wt %, between approximately 2.5 wt % and approximately 16 wt %, between approximately 1 wt % and approximately 8 wt %, between approximately 2 wt % and approximately 4 wt %, between approximately 2.5 wt % and approximately 4.0 wt %, between approximately 2.5 wt % and approximately 3.5 wt %) Zn powder, based on the weight of the core 54. In certain embodiments, the sheath 52 of the tubular welding wire 50 may include between approximately 0.01 wt % and approximately 5 wt % (e.g., between approximately 0.02 wt % and approximately 4 wt %, between approximately 0.05 wt % and approximately 3 wt %, between approximately 0.1 wt % and approximately 2 wt %, between approximately 0.2 wt % and approximately 1.4 wt %) Zn, based on the weight of the sheath 54, wherein the Zn content may be alloyed into the sheath 54, plated onto an inner or outer surface of the sheath 54, and/or coated onto the outer surface of the sheath 54 as a zinc compound (e.g., zinc stearate).

Additionally, the metallic sheath 52 may include certain additives or impurities (e.g., alloying components, carbon, alkali metals, manganese, or similar compounds or elements) that may be selected to provide desired weld properties. In certain embodiments, the metallic sheath 52 of the tubular welding wire 50 may be a low-carbon strip that includes a relatively small (e.g., lower or reduced) amount of carbon (e.g., less than approximately 0.06%, less than approximately 0.07%, or less than approximately 0.08% carbon by weight). For example, in an embodiment, the metallic sheath 52 of the tubular welding wire 50 may include between approximately 0.01% and 0.1% carbon by weight. Additionally, in certain embodiments, the metallic sheath 52 may be made of steel generally having a small number of inclusions. For example, in certain embodiments, the metallic sheath 52 may include between approximately 0.25% and approximately 0.5%, or approximately 0.34% manganese by weight. By further example, in certain embodiments, the metallic sheath 52 may include less than approximately 0.02% phosphorus or sulfur by weight. The metallic sheath 52, in certain embodiments, may also include less than approximately 0.04% silicon by weight, less than approximately 0.05% aluminum by weight, less than approximately 0.1% copper by weight, and/or less than approximately 0.02% tin by weight. By particular example, in certain embodiments, the metallic sheath 52 may be made of an alloy in accordance with American Iron and Steel Institute (AISI) 1008, 1005, 1002, or another suitable alloy.

The granular core 54 of the illustrated tubular welding wire 50 may generally be a compacted powder. In certain embodiments, the granular core 54 may account for between approximately 7% and approximately 40%, or between approximately 10% and approximately 20%, of the total weight of the tubular welding wire 50. For example, in certain embodiments, the granular core 54 may provide approximately 14%, approximately 15%, or approximately 16% of the total weight of the tubular welding wire 50. Furthermore, in certain embodiments, the components of the granular core 54, discussed below, may be homogenously or non-homogenously (e.g., in clumps or clusters 56) disposed within the granular core 54. For example, the granular core 54 of certain disclosed welding wires may include one or more metals (e.g., iron, iron titanium, iron silicon, or other alloys or metals) that may provide at least a portion of the filler metal for the weld. By specific example, in certain embodiments, the granular core 54 may include between approximately 65% and approximately 75% iron powder, as well as other alloying components, such as ferro-titanium (e.g., 40% grade), ferro-magnesium-silicon, and ferro-silicon powder (e.g., 50% grade, unstabilized). Other examples of components that may be present within the tubular welding wire 50 (i.e., in addition to the one or more carbon sources and the one or more alkali metal and/or alkali earth metal compounds) include other stabilizing, fluxing, and alloying components, such as may be found in METALLOY X-CEL™ welding electrodes available from Illinois Tool Works Inc.

Additionally, presently disclosed embodiments of the tubular welding wire 50 may include an organic stabilizer, such as an organometallic compound, disposed in the granular core 54. The organic stabilizer may be any organic molecule that includes one or more alkali metal ions (e.g., Group 1: lithium (Li), sodium (Na), potassium (K), rubidium (Rb), cesium (Cs)) or alkali earth metal ions (e.g., Group 2: beryllium (Be), magnesium (Mg), calcium (Ca), strontium (Sr), or barium (Ba)). That is, in certain embodiments, the organic stabilizer includes an organic subcomponent (e.g., an organic molecule or polymer), which includes carbon, hydrogen, and oxygen, and may be chemically (e.g., covalently or ionically) bonded to the alkali metal or alkali earth metal ions. In other embodiments, the organic stabilizer may include an organic sub-component (e.g., an organic molecule or polymer, such as cellulose) that has been mixed with (e.g., not chemically bonded with) the alkali metal and/or alkali earth metal salt (e.g., potassium oxide, potassium sulfate, sodium oxide, etc.).

By specific example, in certain embodiments, the organic stabilizer may be a cellulose-based (e.g., cellulosic) component including a cellulose chain that has been derivatized to form a sodium or potassium salt (e.g., sodium or potassium carboxymethyl cellulose). For example, in certain embodiments, the cellulose-based organic stabilizer may be sodium carboxymethyl cellulose having a degree of substitution (DS) ranging from approximately 0.5 and approximately 2.5. In general, the DS of a derivatized cellulose may be a real number between 0 and 3, representing an average number of substituted hydroxyl moieties in each monomer unit of the polysaccharide. In other embodiments, the organic stabilizer may be other organic molecules that include one or more Group 1/Group 2 ions. For example, in certain embodiments, the organic stabilizer may include derivatized sugars (e.g., derivatized sucrose, glucose, etc.) or polysaccharides having one or more carboxylic acids or sulfate moieties available to form an alkali metal or alkali earth metal salt. In other embodiments, the organic stabilizer may include soap-like molecules (e.g., sodium dodecyl sulfate or sodium stearate) or alginates. Additionally, in certain embodiments, the organic stabilizer may account for less than approximately 10%, between approximately 0.05% and approximately 5%, between approximately 0.1% and approximately 3%, between approximately 0.25% and approximately 2.5%, between approximately 0.5% and approximately 1.5%, or approximately 1% of the granular core 54 by weight. Additionally, in certain embodiments, the organic stabilizer may account for less than approximately 5%, between approximately 0.05% and approximately 3%, between approximately 0.08% and approximately 2%, between approximately 0.1% and approximately 1%, or approximately 0.15% of the tubular welding wire 50 by weight.

It may be appreciated that the organic stabilizer component of the tubular welding wire 50 may be maintained at a suitable level such that a reducing environment (e.g., hydrogen-rich) may be provided near the welding arc 34, but without introducing substantial porosity into the weld. It should further be appreciated that utilizing an organic molecule as a delivery vehicle for at least a portion of the Group 1/Group 2 ions to the welding arc, as presently disclosed, may not be widely used since organic molecules may generate hydrogen under the conditions of the arc, which may result in porous and/or weak welds for mild steels. However, as set forth below, using the presently disclosed organic stabilizers afford quality welds (e.g., low-porosity welds), even when welding at high travel speed on Zn coated workpieces.

Additionally, presently disclosed embodiments of the tubular welding wire 50 may also include a carbon component disposed in the granular core 54. For example, the carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes and/or similar substantially $sp^2$-hybridized carbon sources may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, and/or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black component in the granular core 54 that may contain a manganese content of approximately 20%. In certain embodiments, the carbon component of the tubular welding wire 50 may be powdered or granular graphite. Additionally, in certain embodiments, the carbon component may account for less than approximately 10%, between approximately 0.01% and approximately 5%, between approximately 0.05% and approximately 2.5%, between approximately 0.1% and approximately 1%, or approximately 0.5% of the granular core 54 by weight. In certain embodiments, the carbon component may account for less than approximately 5%, between approximately 0.01% and approximately 2.5%, between approximately 0.05% and approximately 0.1%, or approximately 0.08% of the tubular welding wire 50 by weight.

Furthermore, in addition to the organic stabilizer discussed above, the tubular welding wire 50 may also include one or more inorganic stabilizers to further stabilize the arc 34. That is, the granular core 54 of the tubular welding wire 50 may include one or more compounds of the Group 1 and Group 2 elements (e.g., Li, Na, K, Rb, Cs, Be, Mg, Ca, Sr, Ba). A non-limiting list of example compounds include: Group 1 (i.e., alkali metal) and Group 2 (i.e., alkaline earth metal) silicates, titanates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. By specific example, the granular core 54 may include potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof as the potassium source. Similar examples of stabilizing compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entireties for all purposes.

Furthermore, for certain embodiments of the presently disclosed tubular welding wire 50, one or more inorganic stabilizers may be included in the granular core 54 in the form of an agglomerate or frit. That is, certain embodiments of the tubular welding wire 50 may include one or more of the inorganic stabilizers described above in an agglomerate or frit that may stabilize the arc during welding. The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, agglomerating, as presently disclosed, may provide a frit that is better suited for the weld environment than the non-agglomerated materials.

In certain embodiments, the granular core 54 of the tubular welding wire 50 may include an agglomerate of one or more alkali metal or alkaline earth metal compounds (e.g., potassium oxide, sodium oxide, calcium oxide, magnesium oxide, or other suitable alkali metal or alkaline earth metal compound). In other embodiments, the granular core 54 of the tubular welding wire 50 may include an agglomerate of a mixture of alkali metal or alkaline earth metal compound and other oxides (e.g., silicon dioxide, titanium dioxide, manganese dioxide, or other suitable metal oxides). For example, one embodiment of a tubular welding wire 50 may include an agglomerated potassium source including of a mixture of potassium oxide, silica, and titania. By further example, another embodiment of a tubular welding wire 50 may include in the granular core 54 another stabilizing agglomerate having a mixture of potassium oxide (e.g., between approximately 22% and 25% by weight), silicon oxide (e.g., between approximately 10% and 18% by weight), titanium dioxide (e.g., between approximately 38% and 42% by weight), and manganese oxide or manganese dioxide (e.g., between approximately 16% and 22% by weight). In certain embodiments, an agglomerate may include between approximately 5% and 75% alkali metal and/or alkaline earth metal compound (e.g., potassium oxide, calcium oxide, magnesium oxide, or other suitable alkali metal and/or alkaline earth metal compound) by weight, or between approximately 5% and 95% alkali metal and/or alkaline earth metal (e.g., potassium, sodium, calcium, magnesium, or other suitable alkali metal and/or alkaline earth metal) by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate mixture. Additionally, in certain embodiments, the agglomerate may account for less than approximately 10%, between approximately 0.1% and approximately 6%, between approximately 0.25% and approximately 2.5%, between approximately 0.5% and approximately 1.5%, or approximately 1% of the granular core 54 by weight. In certain embodiments, the agglomerate may account for less than approximately 5%, between approximately 0.05% and approximately 2.5%, between approximately 0.1% and approximately 0.5%, or approximately 0.15% of the tubular welding wire 50 by weight.

Additionally, the granular core 54 of the tubular welding wire 50 may also include other components to control the welding process. For example, rare earth elements may generally affect the stability and heat transfer characteristics of the arc 34. As such, in certain embodiments, the tubular welding wire 50 may include a rare earth component, such as the Rare Earth Silicide (e.g., available from Miller and Company of Rosemont, Illinois), which may include rare earth elements (e.g., cerium and lanthanum) and other non-rare earth elements (e.g., iron and silicon). In other embodiments, any material including cerium or lanthanum (e.g., nickel lanthanum alloys) may be used in an amount that does not spoil the effect of the present approach. By specific example, in certain embodiments, the rare earth component may account for less than approximately 10%, between approximately 0.01% and approximately 8%, between approximately 0.5% and approximately 5%, between approximately 0.25% and approximately 4%, between approximately 1% and approximately 3%, between approximately 0.75% and approximately 2.5%, or approximately 2% of the granular core 54 by weight. In certain embodiments, the rare earth component may account for less than approximately 5%, between approximately 0.01% and approximately 2.5%, between approximately 0.1% and approximately 0.75%, or approximately 0.3% of the tubular welding wire 50 by weight.

Furthermore, the tubular welding wire 50 may, additionally or alternatively, include other elements and/or minerals to provide arc stability and to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., potassium sulfate) without including a substantial amount of another sulfur source (e.g., pyrite or iron sulfide). For example, in an embodiment, the granular core 54 of the tubular welding wire 50 may include between approximately 0.01% and approximately 0.5%, or approximately 0.2% potassium sulfate.

Generally speaking, one or more components the tubular welding wire 50 may generally stabilize the formation of the arc 34 to the workpiece 22. As such, the disclosed tubular welding wire 50 may improve more than one aspect of the welding process (e.g., spatter, silicon island formation, deposition rate, travel speed, bead shape, weld quality, etc.). It should further be appreciated that the improved stability of the arc 34 may generally enable and improve the welding of galvanized metal workpieces. For example, the presently disclosed tubular welding wire 50 generally reduce spatter and porosity, as well as improve the stability and control the penetration of the arc 34, such that an acceptable weld may be achieved at a high travel rate despite the Zn coating of the galvanized workpiece 22.

Two example embodiments (E1 and E2) of the disclosed tubular welding wire 50 are set forth below in Table 1. For the embodiments presented in Table 1, the Zn content of the tubular welding wire 50 is provided by Zn powder disposed within the granular core 54. As mentioned, in other embodiments, at least a portion of the Zn content of the tubular welding wire 50 may be provided by the metallic sheath 52.

TABLE 1

Example embodiments of the tubular welding wire 50, wherein approximately
15% of the weight of the tubular welding wire 50 is provided by the core 54, and wherein
the Zn content is disposed only in the core 54. Values are provided in weight percentages
relative to the weight of the core (wt % (core)), relative to the weight of the sheath
(wt % (sheath)), and relative to the weight of the wire (wt % (wire)).

|  | Embodiments | | | |
| --- | --- | --- | --- | --- |
|  | E1 | | E2 | |
| Core Composition | wt % (core) | wt % (wire) | wt % (core) | wt % (wire) |
| Iron Powder | 68.3 | 10.2 | 75.0 | 11.3 |
| Potassium Sulfate | 0.2 | 0.0 | 0.2 | 0.0 |

TABLE 1-continued

Example embodiments of the tubular welding wire 50, wherein approximately 15% of the weight of the tubular welding wire 50 is provided by the core 54, and wherein the Zn content is disposed only in the core 54. Values are provided in weight percentages relative to the weight of the core (wt % (core)), relative to the weight of the sheath (wt % (sheath)), and relative to the weight of the wire (wt % (wire)).

| | | | | |
|---|---|---|---|---|
| Rare Earth Silicide (Fe—Si—La/Ce) | 2 | 0.3 | 2.0 | 0.3 |
| Sodium Carboxy-methyl-cellulose | 1 | 0.2 | 1.0 | 0.2 |
| Potassium-Titanate-Manganate Frit | 1 | 0.2 | 1.0 | 0.2 |
| Ferro-titanium (40% grade) | 1.1 | 0.2 | 1.1 | 0.2 |
| Ferro-manganese-silicon | 17.1 | 2.6 | 11.4 | 1.7 |
| Granular Graphite | 0.5 | 0.1 | 0.5 | 0.1 |
| Ferro-silicon Powder | 4.8 | 0.7 | 4.8 | 0.7 |
| Zinc Powder | 4 | 0.6 | 3 | 0.5 |

| Sheath Composition | wt % (sheath) | wt % (wire) | wt % (sheath) | wt % (wire) |
|---|---|---|---|---|
| Iron | 99.51 | 84.58 | 99.51 | 84.58 |
| Carbon | 0.09 | 0.0765 | 0.09 | 0.0765 |
| Manganese | 0.4 | 0.34 | 0.4 | 0.34 |

Tables 2 and 3 present the results of example welding operations of Zn-coated workpieces using embodiments of the tubular welding wire 50 (i.e., E1, E2, and E3), as well as a standard F6 welding wire (i.e., FabCOR F6™ welding wire) for comparison, at a relatively high travel speed (i.e., 40 inches per minute). As indicated, for embodiments E1, E2, and E3 of the present approach, Zn powder accounts for between approximately 2.5 wt % and approximately 4 wt % of the core 54, based on the weight of the core 54. As indicated, disclosed welding wires E1, E2, and E3 enable between approximately 25% and approximately 60% lower spatter levels (e.g., between approximately 35% and approximately 55% lower) when compared to standard FabCOR F6™ welding wires. Furthermore, as indicated in Table 2, embodiments of the disclosed welding wire 50 enable welding operations in which less than approximately 15 wt % (e.g., less than approximately 14 wt %, less than approximately 13 wt %, less than approximately 10 wt %, less than approximately 9 wt %) of the wire 50 is converted to spatter while welding the Zn-coated workpiece.

Additionally, as indicated in Table 3, embodiments E1, E2, and E3 also enable an acceptably low level of porosity when welding zinc-coated workpieces. As indicated, disclosed welding wires E1, E2, and E3 enable the formation of weld deposits having a length porosity that is between approximately 40% and approximately 99% lower (e.g., between approximately 45% and approximately 95% lower, between approximately 60% and approximately 90% lower) when compared to the length porosity observed for standard FabCOR F6™ welding wires. As such, embodiments of the disclosed welding wire 50 enable the formation of weld deposits having a length porosity less than approximately 3% (e.g., less than approximately 2%, less than approximately 1%, less than approximately 0.5%). As indicated, the disclosed welding wires E1, E2, and E3 enable the formation of weld deposits having an area porosity that is between approximately 30% and approximately 99% lower (e.g., between approximately 40% and approximately 95% lower, between approximately 75% and approximately 90% lower) when compared to the area porosity observed for standard FabCOR F6™ welding wires. As such, certain embodiments of the disclosed welding wire 50 enable the formation of weld deposits having an area porosity less than approximately 1.5% (e.g., less than approximately 2%, less than approximately 1%, less than approximately 0.5%), when welding a zinc-coated steel workpiece. Similar results were observed when using DCEN polarity at constant voltage and using pulse welding conditions (e.g., Miller AccuPulse™). Furthermore, the welds produced by embodiments E1, E2, and E3 indicated in Table 3 provide notable improvements with respect to silicon island formation, in which silicon islands were smaller in size and/or positioned toward the toe of the weld in contrast to weld deposits formed using the standard F6 wire.

TABLE 2

Spatter rates for different welding wires during a GMAW welding operation using a 90% Ar/10% $CO_2$ shielding gas mixture and a CV DCEN welding polarity to form bead-on-plate (BOP) joints using the indicated wire at a travel speed of 40 inches per minute. Spatter is indicated in units of grams of spatter per 30 inches of weld deposit and also as a percentage of the wire that is converted to spatter.

| Wire | Zn (wt %-core) | Zn (wt %-wire) | Spatter (g/30″) | Spatter (wt % of wire) |
|---|---|---|---|---|
| F6 | 0 | 0 | 8.6 | 20.4 |
| E1 | 4 | 0.6 | 6.1 | 13.5 |
| E2 | 3 | 0.45 | 4.0 | 8.8 |
| E3 | 2.5 | 0.38 | 6.7 | 14.8 |

TABLE 3

Porosity and Si island measurements for different welding wires during a GMAW welding operation using a 90% Ar/10% $CO_2$ shielding gas mixture and a CV DCEN welding polarity using the indicated wire at a travel speed of 40 inches per minute. Porosity measurements are average values determined by analyzing three lap joints formed using the indicated wire. Si island analysis was performed visually using a microscope.

| Wire | Zn (wt %-core) | Zn (wt %-wire) | Length porosity | Area porosity | Si islands |
|---|---|---|---|---|---|
| F6 | 0 | 0 | 5.0% | 1.7% | distributed throughout the surface |
| E1 | 4 | 0.6 | 2.9% | 1.2% | distributed throughout the surface but small in size |
| E2 | 3 | 0.45 | 0.0% | 0.0% | distributed towards the toe of the weld |
| E3 | 2.5 | 0.38 | 1.9% | 0.4% | distributed throughout the surface but small in size |

Table 4 indicates various properties and the all-weld-metal (AWM) composition of four example weld deposits (i.e., W1, W2, W3, and W4) formed using an embodiment of the disclosed tubular welding wire 50 (i.e., E2). As indicated in Table 4, embodiments of the tubular welding wire 50 enable the formation of weld deposits having an ultimate tensile strength (UTS) greater than 60 kilopounds per square inch (ksi), greater than 70 ksi, greater than 80 ksi, or even greater than 90 ksi, depending on the welding parameters. These weld deposits also offer a yield strength greater than 50 ksi, greater than 60 ksi, or greater than 70 ksi, depending on the welding parameters. Furthermore, embodiments of the tubular welding wire 50 enable the formation of weld deposits having Charpy V-notch toughness values at −20° C. greater than 50 ft-lbs, greater than 60 ft-lbs, greater than 70 ft-lbs, or greater than 75 ft-lbs, and values at −40° C. greater than 30 ft-lbs, greater than 40 ft-lbs, or greater than 50 ft-lbs. It may be noted that the tubular welding wire 50 enables the formation of weld deposits (e.g., W3) that conform with the physical and composition requirements of AWS 5.18. It may be appreciated that zinc, while deposited on the surface of the A36 workpiece, zinc is usually not observed beyond potential trace quantities (e.g., parts-per-million (ppm) or less) in the AWM deposit, due to the relatively low melting point of zinc (1565° F.) relative to that of iron (2800° F.).

TABLE 4

Welding parameters, weld properties, and all-weld-metal composition of four example weld deposits formed using an embodiment of the disclosed tubular welding wire 50 (i.e., E2) in multipass welding operations. Wire feed speed is provided in inches per minute (ipm). Additional welding parameters include: Plate (workpiece): A36 galvanized steel; Plate Thickness: ¾ in.; Angle: 45°; Root opening: ½ in.; Position: 1 g; Preheat: 70° F.; Welding Voltage: 28 volts (V); Shielding gas: 90% Argon/10% $CO_2$; Travel Speed: 10 ipm; Electrical Stickout: 0.75 in.; Total Passes: 14; Total Layers: 7.

| Parameters | W1 | W2 | W3 | W4 |
|---|---|---|---|---|
| Diameter (in.) | 0.035 | 0.035 | 0.052 | 0.052 |
| Wire feed speed (ipm) | 425 | 425 | 350 | 350 |
| Current | DCEN | DCEP | DCEN | DCEP |
| Properties | | | | |
| Ultimate tensile strength (ksi) | 84.6 | 83.3 | 93.2 | 91.1 |
| Yield Strength (ksi) | 72.1 | 70.7 | 78.6 | 77.7 |
| Elongation (%) | 24.7 | 21.8 | 23.9 | 23.2 |
| Reduction Area (%) | 48.4 | 46.4 | 60 | 51.1 |
| CVN @ −20° C. (ft-lbs) | 71.3 | 62.0 | 77.0 | 57.7 |
| CVN @ −40° C. (ft-lbs) | 52.3 | 39.0 | 51.7 | 34.0 |
| AWM Composition (wt %) | | | | |
| Carbon | 0.096 | 0.082 | 0.123 | 0.116 |
| Manganese | 1.089 | 1.223 | 1.181 | 1.211 |
| Phosphorus | 0.007 | 0.007 | 0.006 | 0.007 |
| Sulfur | 0.014 | 0.013 | 0.013 | 0.013 |
| Silicon | 0.745 | 0.793 | 0.782 | 0.841 |
| Copper | 0.064 | 0.054 | 0.057 | 0.067 |
| Chromium | 0.041 | 0.038 | 0.038 | 0.041 |
| Vanadium | 0.001 | 0.001 | 0.001 | 0.001 |
| Nickel | 0.023 | 0.022 | 0.022 | 0.023 |
| Molybdenum | 0.012 | 0.01 | 0.011 | 0.013 |
| Aluminum | 0.012 | 0.016 | 0.013 | 0.014 |
| Titanium | 0.024 | 0.031 | 0.034 | 0.042 |
| Niobium | 0.002 | 0.002 | 0.002 | 0.002 |
| Cobalt | 0.003 | 0.002 | 0.003 | 0.004 |
| Boron | 0.0005 | 0.0009 | 0.0004 | 0.0008 |
| Tungsten | 0.004 | 0.001 | 0.003 | 0.004 |
| Tin | 0.012 | 0.011 | 0.011 | 0.013 |
| Lead | 0.001 | 0.001 | 0 | 0.001 |

TABLE 4-continued

Welding parameters, weld properties, and all-weld-metal composition of four example weld deposits formed using an embodiment of the disclosed tubular welding wire 50 (i.e., E2) in multipass welding operations. Wire feed speed is provided in inches per minute (ipm). Additional welding parameters include: Plate (workpiece): A36 galvanized steel; Plate Thickness: ¾ in.; Angle: 45°; Root opening: ½ in.; Position: 1 g; Preheat: 70° F.; Welding Voltage: 28 volts (V); Shielding gas: 90% Argon/10% $CO_2$; Travel Speed: 10 ipm; Electrical Stickout: 0.75 in.; Total Passes: 14; Total Layers: 7.

| Parameters | W1 | W2 | W3 | W4 |
|---|---|---|---|---|
| Zirconium | 0.002 | 0.003 | 0.002 | 0.002 |
| Antimony | 0.001 | 0.001 | 0.001 | 0.001 |
| Iron and Trace Elements | Remainder | Remainder | Remainder | Remainder |

While certain components of the disclosed welding wires (e.g., organic stabilizer, rare earth silicide, K—Ti—Mn frit) have been previously disclosed as being advantageous for welding Zn coated workpieces, the intentional addition of Zn to a welding wire to improve the welding of Zn coated workpieces has not been previously reported as it is unexpected. As such, it is further noted that, the use of certain disclosed components (e.g., organic stabilizers, rare earth silicides, K—Ti—Mn frit), in combination with the disclosed Zn content, enables additional of advantages in terms of lower spatter, low porosity, good arc stability, good arc penetration, and so forth, when welding Zn coated workpieces.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A welding consumable, comprising:
a metallic sheath comprising steel surrounding a granular core comprising between 0.4 wt % and approximately 4 wt % zinc, based on the weight of the welding consumable, wherein the zinc is disposed within the granular core of the welding consumable.

2. The welding consumable of claim 1, wherein the welding consumable comprises between approximately 0.5 wt % and approximately 0.6 wt % zinc, based on the weight of the welding consumable.

3. The welding consumable of claim 2, wherein the welding consumable comprises between 0.5 wt % and 0.6 wt % zinc, based on the weight of the welding consumable.

4. The welding consumable of claim 1, wherein less than approximately 15 wt % of the welding consumable is converted to spatter when welding a zinc-coated steel workpiece.

5. The welding consumable of claim 1, wherein the welding consumable is configured to form a weld deposit having a length porosity less than approximately 3% when welding a zinc-coated steel workpiece.

6. The welding consumable of claim 1, wherein the welding consumable is configured to form a weld deposit having an area porosity less than approximately 1.5% when welding a zinc-coated steel workpiece.

7. A tubular welding wire, comprising:
a metallic sheath comprising steel surrounding a granular core, wherein the tubular welding wire includes between 0.4 wt % and approximately 4 wt % zinc, based on the weight of the tubular welding wire, wherein the zinc is disposed as zinc powder in the granular core.

8. The tubular welding wire of claim 7, wherein the granular core comprises between approximately 2 wt % and approximately 4 wt % zinc powder, based on the weight of the granular core.

9. The tubular welding wire of claim 8, wherein the granular core comprises between approximately 2.5 wt % and approximately 4 wt % zinc powder, based on the weight of the granular core.

10. The tubular welding wire of claim 9, wherein the granular core comprises between approximately 2.5 wt % and approximately 3.5 wt % zinc powder, based on the weight of the granular core.

11. The tubular welding wire of claim 7, wherein the granular core includes between approximately 0.05 wt % and approximately 5 wt % of an organic stabilizer, based on the weight of the core, and wherein the organic stabilizer comprises a Group 1 or Group 2 salt of carboxymethyl cellulose.

12. The tubular welding wire of claim 7, wherein the granular core includes between approximately 0.5 wt % and approximately 5 wt % of a rare earth component, based on the weight of the granular core, wherein the rare earth component comprises cerium, lanthanum, or a combination thereof.

13. The tubular welding wire of claim 7, wherein the granular core includes between approximately 0.01 wt % and approximately 5 wt % of a carbon component, based on the weight of the granular core, and wherein the carbon component comprises graphite, graphene, carbon black, lamp black, carbon nanotubes, diamond, or a combination thereof.

14. The tubular welding wire of claim 7, wherein the granular core includes between approximately 0.5 wt % and approximately 1.5 wt % of a particular agglomerate, based on the weight of the granular core, wherein the particular agglomerate comprises a Group 1 or Group 2 oxide, and titanium oxide, and manganese oxide.

15. The tubular welding wire of claim 7, wherein the tubular welding wire comprises between approximately 0.4 wt % and approximately 0.6 wt % zinc, based on the weight of the tubular welding wire.

16. The tubular welding wire of claim 7, wherein the tubular welding wire is a metal-cored welding wire.

17. The tubular welding wire of claim 7, wherein the tubular welding wire is a flux-cored welding wire.

18. A tubular welding wire, comprising:
a metallic sheath comprising steel surrounding a granular core, wherein the tubular welding wire includes between 0.4 wt % and approximately 0.6 wt % zinc, based on the weight of the tubular welding wire, wherein the zinc is disposed as zinc powder in the granular core, and wherein the granular core includes:

between approximately 0.05 wt % and approximately 5 wt % of an organic stabilizer;

between approximately 0.5 wt % and approximately 5 wt % of a rare earth component;

between approximately 0.01 wt % and approximately 5 wt % of a carbon component; and between approximately 0.5 wt % and approximately 1.5 wt % of an agglomerate, all based on the weight of the granular core.

19. The tubular welding wire of claim 18, wherein the organic stabilizer component comprises sodium carboxymethyl cellulose, wherein the rare earth component comprises cerium silicide, lanthanum silicide, or a combination thereof, wherein the carbon component comprises graphite, graphene, carbon black, lamp black, carbon nanotubes, diamond, or a combination thereof, and wherein the agglomerate comprises a Group 1 or Group 2 oxide, and titanium oxide, and manganese oxide.

20. The tubular welding wire of claim 18, wherein the metallic sheath comprises between approximately 0.01 wt % and approximately 0.1 wt % carbon and between approximately 0.25 wt % and approximately 0.5 wt % manganese based on the weight of the metallic sheath.

* * * * *